United States Patent
Hsieh et al.

(10) Patent No.: US 8,049,925 B2
(45) Date of Patent: Nov. 1, 2011

(54) IMAGE PROCESSING APPARATUS AND METHOD FOR ADJUSTING LIGHTNESS OF IMAGE

(75) Inventors: Tung-Lin Hsieh, Jhongli (TW); Yao-Shun Tseng, Nantou (TW); Wan-Ching Lee, Sinjhuang (TW); Hsin-Hung Lee, Fongshan (TW)

(73) Assignee: Quanta Computer Inc., Tao Yuan Shien (TW)

( * ) Notice: Subject to any disclaimer, the term of this patent is extended or adjusted under 35 U.S.C. 154(b) by 407 days.

(21) Appl. No.: 12/285,452

(22) Filed: Oct. 6, 2008

(65) Prior Publication Data

US 2009/0180129 A1    Jul. 16, 2009

(30) Foreign Application Priority Data

Jan. 11, 2008   (TW) ................................ 97101108 A

(51) Int. Cl.
*H04N 1/60* (2006.01)
*G06K 15/00* (2006.01)

(52) U.S. Cl. ........................................ 358/1.9; 358/1.13

(58) Field of Classification Search ........................ None
See application file for complete search history.

(56) References Cited

U.S. PATENT DOCUMENTS

| 7,029,437 | B2 * | 4/2006 | Kobayashi | 600/180 |
|---|---|---|---|---|
| 7,426,312 | B2 * | 9/2008 | Dance et al. | 382/254 |
| 7,623,727 | B2 * | 11/2009 | Takahashi | 382/272 |
| 2002/0159080 | A1 * | 10/2002 | Feng et al. | 358/1.9 |
| 2005/0219649 | A1 | 10/2005 | Kim | |
| 2006/0082849 | A1 * | 4/2006 | Kaku | 358/537 |
| 2008/0025635 | A1 * | 1/2008 | Han et al. | 382/274 |
| 2009/0106016 | A1 * | 4/2009 | Athsani et al. | 704/3 |

* cited by examiner

*Primary Examiner* — Twyler Haskins
*Assistant Examiner* — Christopher D Wait
(74) *Attorney, Agent, or Firm* — Thomas, Kayden, Horstemeyer & Risley, LLP

(57) ABSTRACT

An image processing apparatus is disclosed. The image processing apparatus comprises a dividing module, a calculating module, a judging module and an adjusting module. The dividing module is used for dividing an image into a plurality of sub-images. The calculating module is used for generating a lightness threshold of the image. The judging module is used for comparing an original average lightness of a target sub-image among the plurality of sub-images with the lightness threshold. The adjusting selectively increases the original average lightness of the target sub-image according to the first judging module.

11 Claims, 3 Drawing Sheets

IMAGE PROCESSING APPARATUS AND METHOD FOR ADJUSTING LIGHTNESS OF IMAGE

BACKGROUND OF THE INVENTION

1. Field of the Invention

The invention relates to image processing, and particularly, to an image processing apparatus and an image processing method of adjusting the lightness of the image for saving ink.

2. Description of the Prior Art

In recent years, because the image processing technology has been continually progressing, there have been various image input/output apparatuses with different functions launched in the market. For example, the image input/output apparatus can be a scanner, a printer, a copier, or an all-in-one printer.

In general, when a user wants to convert a figure or a texture shown on the document into an image file stored in the computer, a scanner is needed to scan the figure or the texture into the computer. In fact, if a user wants to copy a figure or a texture shown on the document, a copier can be directly used to perform the copy function. In addition, the figure or the texture shown on the document can be converted into an image file by a scanner first, and then the image file is printed by a printer.

In the above-mentioned methods, the image input/output apparatus such as a scanner or a copier is needed to perform the scanning or copying function. It is quite inconvenient for users. Thus, a portable computer system combined with the conventional notebook was provided. The portable computer system is capable of scanning a document image via the web camera (webcam) and the back-light module of the portable computer system. If the portable computer system connects to another printer, the function of copying the document image can be further accomplished.

However, although the portable computer system has advantages of easy carry and operation, it still has some disadvantages. For instance, if the light source provided by the back-light module or the ambient light is not uniform, the lighting of the document image captured by the webcam of the portable computer system will not be uniform either. In addition, when the background of the document image is not white, a lot of ink will be wasted during printing.

Therefore, the main scope of the invention is to provide an image processing apparatus and an image processing method to solve the above-mentioned problems.

SUMMARY OF THE INVENTION

An image processing apparatus and an image processing method are disclosed. An embodiment of the invention is an image processing apparatus. The image processing apparatus comprises a dividing module, a calculating module, a judging module and an adjusting module.

In the embodiment, the dividing module is used for dividing an image into a plurality of sub-images. The calculating module is coupled to the dividing module and used for generating a lightness threshold of the image. The judging module is coupled to the calculating module and used for comparing an original average lightness of a target sub-image among the plurality of sub-images with the lightness threshold. The adjusting module is coupled to the judging module and selectively increasing the original average lightness of the target sub-image according to the judging module.

Compared to the prior art, the image processing apparatus and method based on the invention can adjust the original average lightness of a target sub-image divided from a document image according to the judgment on whether the target sub-image is a background image. Accordingly, not only the ink used for printing a document image will be effectively saved, but also the disuniformity of image lightness caused by the light source (e.g., the back-light module or the ambient light) will be improved. The concept provided by the invention can be applied to the portable computer system with scanning function, or an ordinary scanning/copying system.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
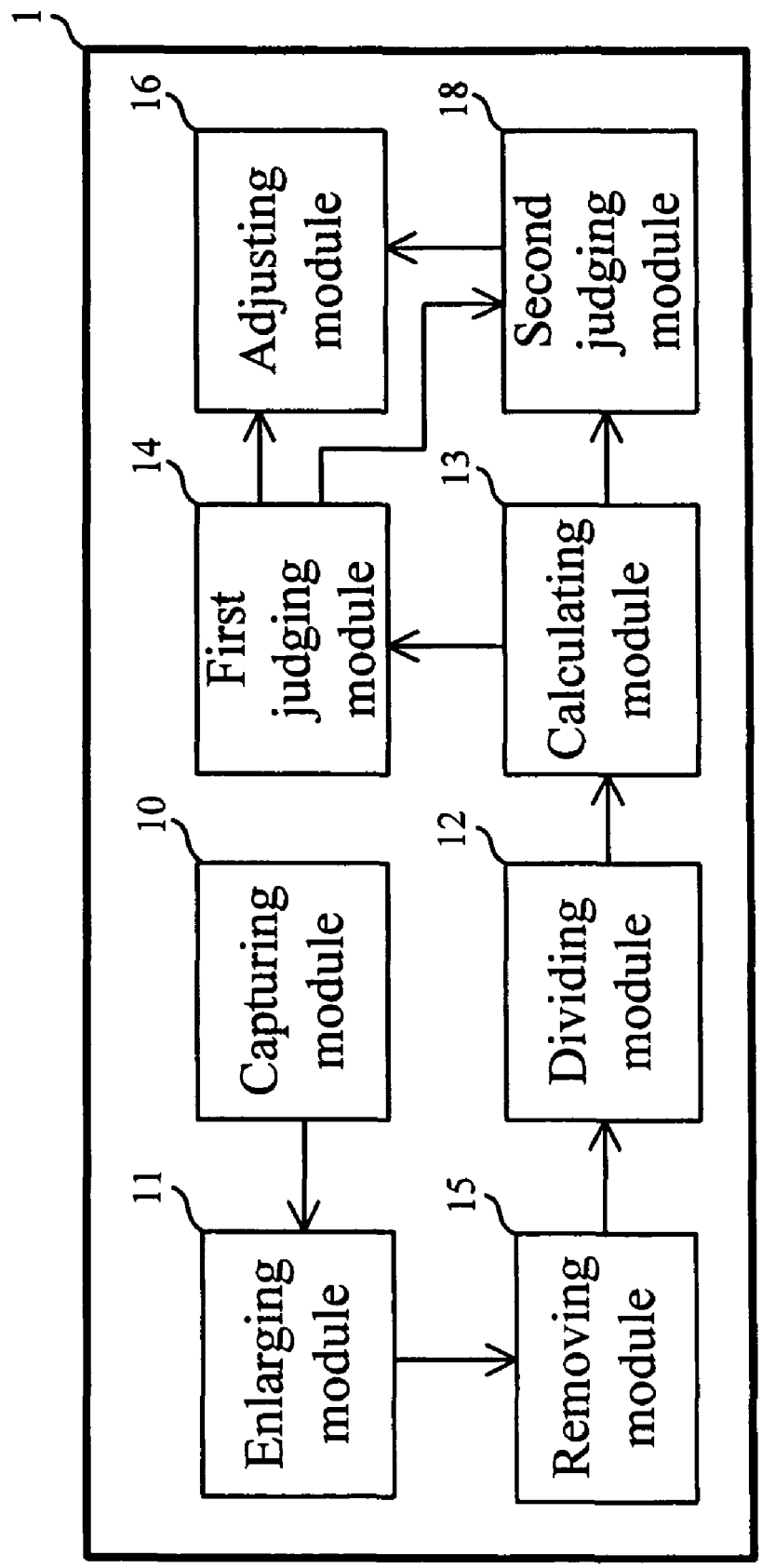
FIG. 1 shows the functional block diagram of the image processing apparatus in the first embodiment and the second embodiment according to the invention.

The first embodiment according to the invention is an image processing apparatus. Please refer to FIG. 1. FIG. 1 shows the functional block diagram of the image processing apparatus. As shown in FIG. 1, the image processing apparatus 1 comprises a capturing module 10, an enlarging module 11, a dividing module 12, a calculating module 13, a first judging module 14, a removing module 15, an adjusting module 16, and a second judging module 18.

In the embodiment, the dividing module 12 is used for dividing an image into a plurality of sub-images. And, the calculating module 13 is coupled to the dividing module 12 and used for generating a lightness statistics (e.g., a lightness histogram) related to the image and determining a lightness threshold $L_{th}$ according to the lightness statistics.

In the embodiment, the first judging module 14 is coupled to the calculating module 13 and used for judging whether an original average lightness $L_I$ of a target sub-image I is higher than the lightness threshold $L_{th}$ wherein the target sub-image I is the sub-image which the image processing apparatus 1 is processing.

The adjusting module 16 is coupled to the first judging module 14. If the judgment of the first judging module 14 is yes (namely the original average lightness $L_I$ of the target sub-image I is higher than the lightness threshold $L_{th}$), the target sub-image I is considered as the background of the document image. Then, the adjusting module 16 will adjust the original average lightness $L_I$ of the target sub-image I. The lightness adjustment can be done by increasing the average lightness $L_I$ of the target sub-image I or directly adjusting the target sub-image I into a white one to achieve the ink-saving effect during printing.

In this embodiment, the capturing module 10 is used for capturing an original image. In fact, the capturing module 10 can be any apparatus capable of picturing an image such as a video camera, a mobile phone, a camera, a built-in web camera, or an external web camera.

In this embodiment, the enlarging module 11 is coupled to the dividing module 12 and used for enlarging the original image for further processing. The reason why the original image should be enlarged is that the image will be divided into many sub-images by the dividing module 12. If the size of the sub-image is too small, a character of the image may be divided into different sub-images, and the best image processing effect cannot be achieved. Therefore, in order to obtain the sub-images with an appropriate size, the enlarging module 11 is used to enlarge the original image whose size is not large enough.

For example, assuming the size of a document image taken by a digital camera is (1600*1200) pixels, and the size of sub-images is (120*90) pixels. If the document image will be printed in A4 size (29.7 cm*21 cm) and 1 cm equals to 60 pixels, the total size of (1782*1260) pixels is needed. Due to 1782 divided by 120 equals 14.85, and 1260 divided by 90 equals 14, and the number of sub-images is based on $2^n$, $2^4$ is then selected (since 16 is larger than 14.85). Thus, the size of the document image should be enlarged from the size of (1600*1200) pixels to the size of (120*90)*16 pixels, namely the size of (1920*1440) pixels for being divided into sub-images with an appropriate size to achieve better image processing effect.

In this embodiment, the removing module 15 is used for removing a noise from the image before the image is divided. So the removing module 15 can be coupled between the capturing module 10 and the enlarging module 11, or between the enlarging module 11 and the dividing module 12. In fact, the removing module 15 can remove the noise from the image by smoothening the image or switching on/off the operation to enhance the effect generated by the following image processing steps.

In this embodiment, the second judging module 18 is coupled to the first judging module 14 and the calculating module 13. The calculating module 13 generates a lightness difference $\Delta L$ by subtracting a minimum lightness $L_{min}$ of the target sub-image I from a maximum lightness $L_{max}$ of the target sub-image I. If the judgment of the first judging module 14 is no (namely the average lightness $L_I$ of the target sub-image I is smaller than the lightness threshold $L_{th}$), it means that the target sub-image I may have both the background image and the character image. In order to make sure whether the target sub-image I has the character image, the second judging module 18 judges whether the lightness difference $\Delta L$ of the target sub-image I is smaller than a lightness difference threshold $\Delta L_{th}$. In general, the lightness difference threshold $\Delta L_{th}$ is conventionally set to be a small value (e.g. 20) to achieve a better image processing effect.

In practical applications, the lightness difference $\Delta L$ can show whether the lightness of the target sub-image I is uniform. If the target sub-image I has both the background image and the character image, its lightness difference $\Delta L$ will be larger than that of the target sub-image I having the background image only.

Afterward, the two possible judging results generated by the second judging module 18 are discussed. If the judgment of the second judging module 18 is yes (namely the lightness difference $\Delta L$ of the target sub-image I is smaller than the lightness difference threshold $\Delta L_{th}$), it means that the lightness of the target sub-image I is uniform. Thus, the target sub-image I is considered as the background of the document image only, even though the average lightness $L_I$ of the target sub-image I is smaller than the lightness threshold $L_{th}$ (the reason is that the target sub-image I may be affected by the ambient light). Then, the adjusting module 16 will adjust the average lightness $L_I$ of the target sub-image I. The lightness adjustment can be done by increasing the average lightness $L_I$ of the target sub-image I or directly adjusting the target sub-image I into a white one to achieve the ink-saving effect during the document image is printed.

On the other hand, if the judgment of the second judging module 18 is no (namely the lightness difference $\Delta L$ of the target sub-image I is larger than the lightness difference threshold $\Delta L_{th}$), it means that the lightness of the target sub-image I is not uniform. The reason why the target sub-image I has higher lightness difference is that the target sub-image I has both the background image and the character image. Thus, the target sub-image I will be considered as the non-background part of the document image. The average lightness of the target sub-image I will not be changed; namely, the adjusting module 16 will not function on the target sub-image I.

In practical applications, because the lights projected by the backlight module of the portable computer system in the prior art may not be uniform enough, or the distribution of the ambient lights is not uniform, the document image scanned or copied by the portable computer system usually has darker background or disuniform lightness. However, the image processing apparatus according to the invention can largely improve this drawback.

The second embodiment according to the invention is an image processing apparatus. Please refer to FIG. 1. FIG. 1 also shows the functional block diagram of the image processing apparatus of the second embodiment. As shown in FIG. 1, the image processing apparatus 1 comprises a capturing module 10, an enlarging module 11, a dividing module 12, a calculating module 13, a first judging module 14, a removing module 15, an adjusting module 16, and a second judging module 18.

In this embodiment, the dividing module 12 is used for dividing an image into a plurality of sub-images. The calculating module 13 is coupled to the dividing module 12 and used for generating a lightness difference $\Delta L$ by subtracting a minimum lightness $L_{min}$ from a maximum lightness $L_{max}$ of a target sub-image I among the plurality of sub-images. The first judging module 14 is coupled to the calculating module 13 and used for judging whether the lightness difference $\Delta L$ is smaller than a lightness difference threshold $\Delta L_{th}$.

As shown in FIG. 1, the adjusting module 16 is coupled to the first judging module 14. If the judgment of the first judging module 14 is yes (namely the lightness difference $\Delta L$ is smaller than a lightness difference threshold $\Delta L_{th}$), it means that the lightness of the target sub-image I is uniform, and the target sub-image I can be considered as the background part of the document image. Thus, the adjusting module 16 will adjust the average lightness $L_I$ of the target sub-image I. The lightness adjustment can be done by increasing the average lightness $L_I$ of the target sub-image I or directly adjusting the target sub-image I into a white one to achieve the ink-saving effect during printing.

In this embodiment, the capturing module 10 is used for capturing an original image. In fact, the capturing module 10 can be any apparatus capable of picturing an image such as a video camera, a mobile phone, a camera, a built-in web camera, or an external web camera.

In this embodiment, the enlarging module 11 is coupled to the dividing module 12 and used for enlarging the original image so that the image is formed. The reason why the original image should be enlarged is already mentioned in the first embodiment, it is not described again here.

In addition, the removing module 15 is used for removing a noise from an image before the image is divided. In fact, the removing module 15 can be coupled between the capturing module 10 and the enlarging module 11, or between the enlarging module 11 and the dividing module 12.

In this embodiment, the second judging module 18 is coupled to the first judging module 14 and the calculating module 13. If the judgment of the first judging module 14 is no (namely the lightness difference ΔL of the target sub-image I is larger than a lightness difference threshold $\Delta L_{th}$), it means that the lightness of the target sub-image I is not uniform. In order to further confirm whether the target sub-image I has the character image, the second judging module 18 judges whether the original average lightness $L_I$ of the target sub-image I is higher than a lightness threshold $L_{th}$. The calculating module 13 determines the lightness threshold according to a lightness statistics related to the image.

If the judgment of the second judging module 18 is yes (namely the original average lightness $L_I$ of the target sub-image I is higher than a lightness threshold $L_{th}$), the target sub-image I is considered as the background of the document image even though the lightness of the target sub-image I is not uniform (the reason is that the target sub-image I may be affected by the ambient light). Thus, the adjusting module 16 will adjust the original average lightness $L_I$ of the target sub-image I. For example, the lightness adjustment can be done by increasing the average lightness $L_I$ of the target sub-image I or directly adjusting the target sub-image I into a white one to achieve the ink-saving effect during printing.

On the other hand, if the judgment of the second judging module 18 is no (namely the average lightness $L_I$ of the target sub-image I is smaller than the lightness threshold $L_{th}$ and then the target sub-image I may have the background image and the character image), the target sub-image I will be considered as the non-background image. Therefore, the adjusting module 16 will not adjust the original average lightness $L_I$ of the target sub-image I.

Figure 2:
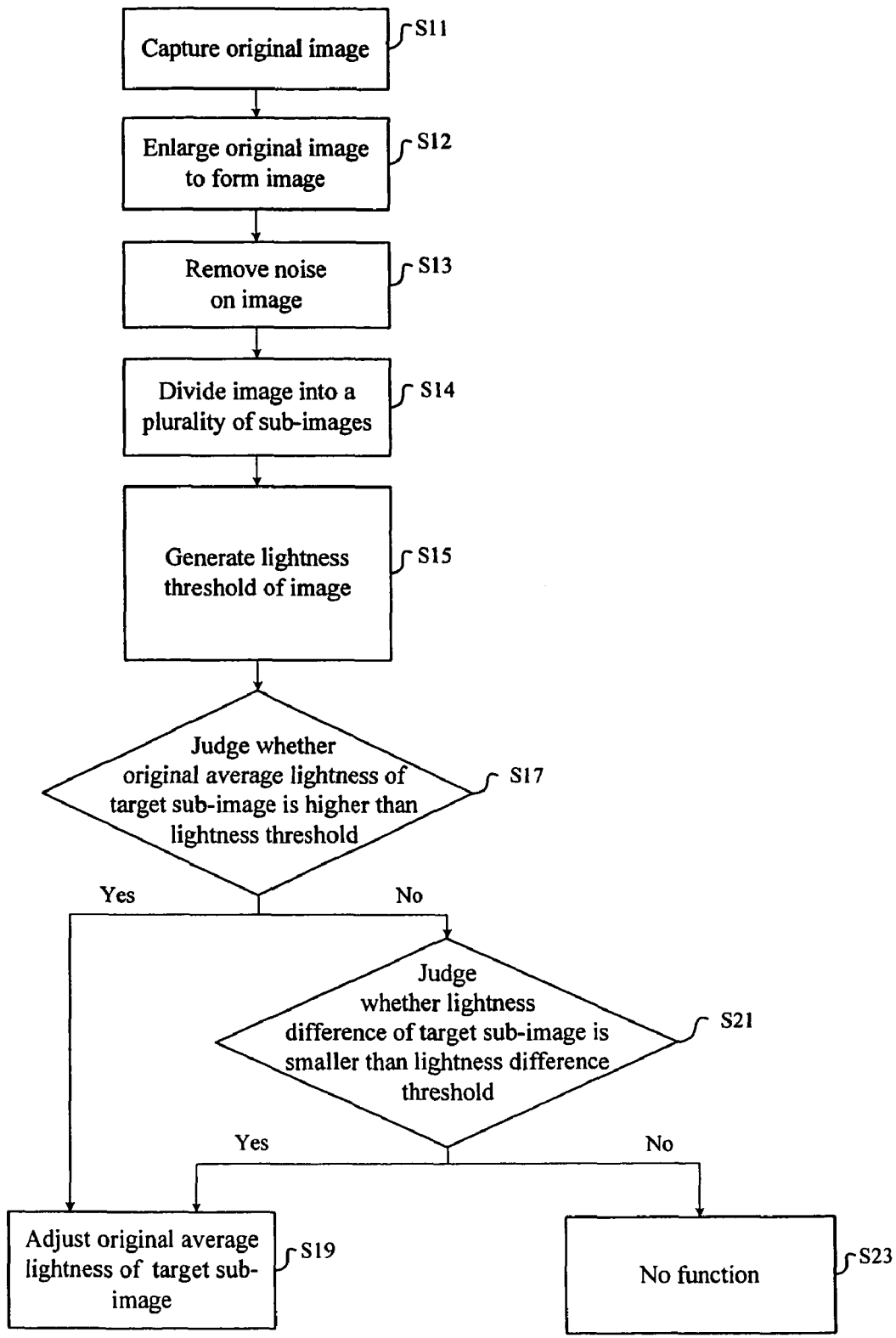
FIG. 2 shows the flowchart of the image processing method in the third embodiment according to the invention.

The third embodiment according to the invention is an image processing method. Please refer to FIG. 2. FIG. 2 shows the flowchart of the image processing method of the third embodiment. As shown in FIG. 2, step S14 is performed for dividing an image into a plurality of sub-images first. Next, step S15 is performed for generating a lightness statistics related to the image and determining a lightness threshold according to the lightness statistics. Then, step S17 is performed for judging whether an original average lightness of a target sub-image is higher than the lightness threshold. If the judgment of step S17 is yes, step S19 is performed for adjusting the original average lightness of the target sub-image. In fact, the original average lightness of the target sub-image is increased by step S19.

As shown in FIG. 2, steps S11, S12, and S13 can be performed before step S14. The step S11 is performed for capturing an original image. Then, step S12 is performed for enlarging the original image to form the image. And, step S13 is performed for removing a noise from the image. It should be noticed that the step S13 can also be processed before the step S12.

In practical applications, a lightness difference of the target sub-image can be generated by subtracting a minimum lightness of the target sub-image from a maximum lightness of the target sub-image. As shown in FIG. 2, if the judgment of the step S17 is no, the step S21 is performed for judging whether the lightness difference of the target sub-image is smaller than a lightness difference threshold. If the judgment of the step S21 is yes, the step S19 is performed for adjusting the original average lightness of the target sub-image. On the other hand, if the judgment of the step S21 is no, the step S23 is performed for maintaining the original average lightness of the target sub-image unchanged.

Figure 3:
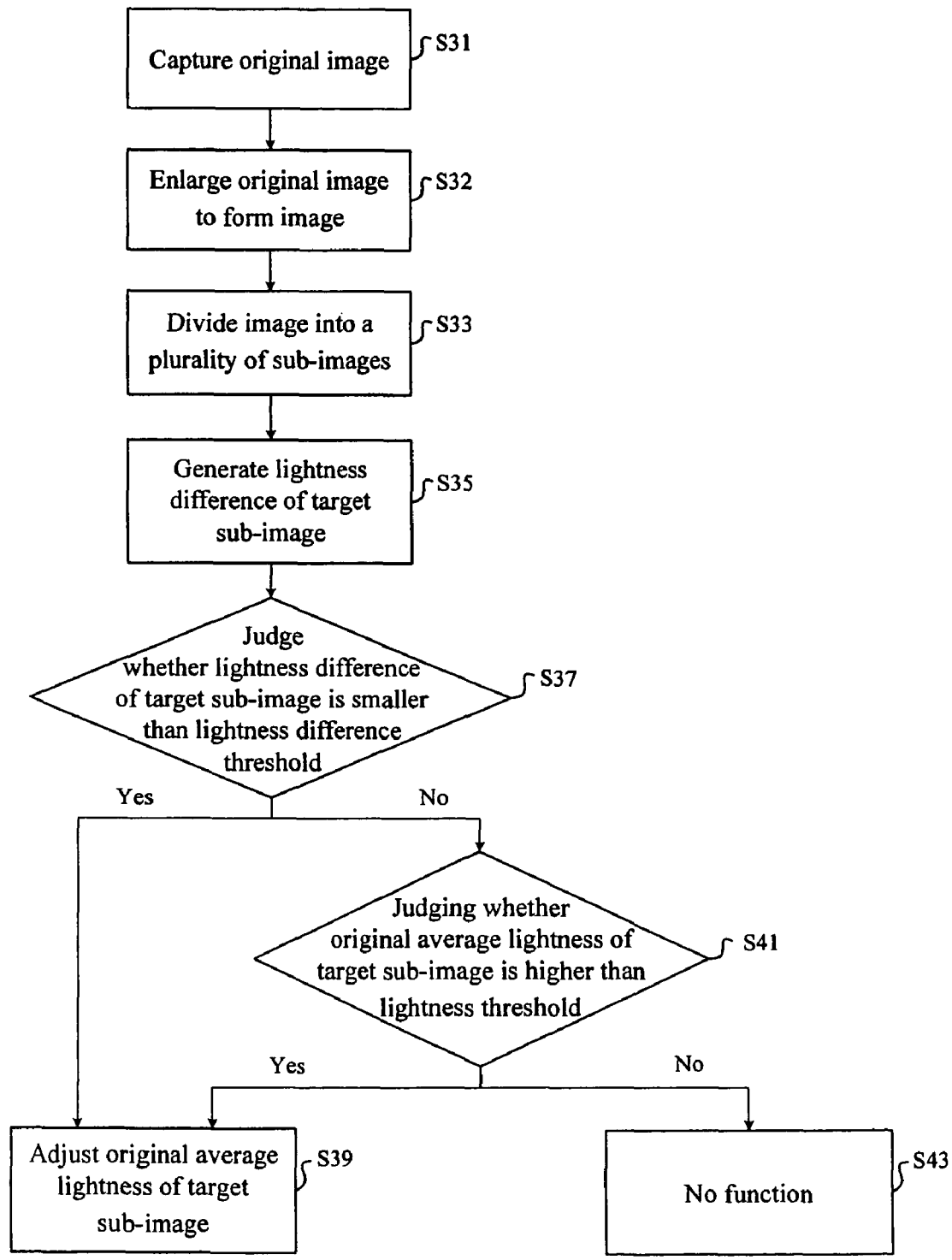
FIG. 3 shows the flowchart of the image processing method in the fourth embodiment according to the invention.

The fourth embodiment according to the invention is also an image processing method. Please refer to FIG. 3. FIG. 3 shows the flowchart of the image processing method. As shown in FIG. 3, step S33 is performed for dividing an image into a plurality of sub-images. Next, step S35 is performed for generating a lightness difference of a target sub-image by subtracting a minimum lightness of the target sub-image from a maximum lightness of the target sub-image. Then, step S37 is performed for judging whether the lightness difference of the target sub-image is smaller than a lightness difference threshold. If the judgment of step S37 is yes, step S39 is performed for adjusting an original average lightness of the target sub-image. In fact, the original average lightness of the target sub-image is increased by step S39. As shown in FIG. 3, steps S31 and S32 can be performed before step S33. The step S31 is performed for capturing an original image. Then, step S32 is performed for enlarging the original image to form the image. And, step S33 is performed for removing a noise from the image. It should be noticed that step S33 can also be processed before step S32.

In practical applications, a lightness statistics related to the image can be generated and a lightness threshold can be determined according to the lightness statistics. If the judgment of step S37 is no, step S41 is performed for judging whether the original average lightness of the target sub-image is higher than the lightness threshold. If the judgment of step S41 is yes, step S39 is performed for adjusting the original average lightness of the target sub-image. In fact, the lightness adjustment can be done by increasing the average lightness of the target sub-image or directly adjusting the target sub-image into a white one to achieve the ink-saving effect during printing. If the judgment of step S41 is no, step S43 is performed for maintaining the original average lightness of the target sub-image unchanged.

Compared to the prior art, the image processing apparatus and method according to the invention can adjust the original average lightness of a target sub-image according to the judgment on whether the target sub-image divided from an image is a background image. Therefore, it can not only effectively save the ink during printing but also improve the disuniformity of image lightness caused by the light source.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An image processing apparatus, comprising:
a dividing module for dividing an image into a plurality of sub-images;
a calculating module, coupled to the dividing module, for generating a lightness difference of a target sub-image among the plurality of sub-images;
a first judging module, coupled to the calculating module, for judging whether the lightness difference is smaller than a first lightness threshold; and
an adjusting module, coupled to the first judging module, for increasing the original average lightness of the target sub-image or adjusting the target sub-image into a white image if the lightness difference is smaller than the first lightness threshold.

2. The image processing apparatus of claim 1, further comprising:
a capturing module, coupled to the dividing module, for capturing the image.

3. The image processing apparatus of claim 1, further comprising:

a removing module, coupled to the dividing module, for removing a noise on the image before the image is divided.

4. The image processing apparatus of claim 1, further comprising:
a second judging module, coupled to the first judging module and the adjusting module, for selectively comparing the original average lightness of the target sub-image with a second lightness threshold of the image according to the first judging module;
wherein the adjusting module selectively increases the original average lightness of the target sub-image according to the second judging module.

5. The image processing apparatus of claim 4, wherein the second lightness threshold of the image is generated according to a lightness histogram of the image.

6. An image processing method, comprising the steps of:
(a) dividing an image into a plurality of sub-images;
(b) generating a first lightness threshold of the image;
(c) judging whether an original average lightness of a target sub-image among the plurality of sub-images is higher than the first lightness threshold;
(d) judging whether the lightness difference is smaller than a second lightness threshold if the original average lightness of the target sub-image is higher than the first lightness threshold; and
(e) increasing the original average lightness of the target sub-image or adjusting the target sub-image into a white image if the lightness difference is smaller than the second lightness threshold.

7. An image processing method of claim 6, wherein the first lightness threshold of the image is generated according to a lightness histogram of the image.

8. An image processing method, comprising the steps of:
(a) dividing an image into a plurality of sub-images;
(b) generating a lightness difference of a target sub-image among the plurality of sub-images;
(c) judging whether the lightness difference is smaller than a first lightness threshold; and
(d) increasing the original average lightness of the target sub-image or adjusting the target sub-image into a white image if the lightness difference is smaller than the first lightness threshold.

9. The image processing method of claim 7, further comprising the step of:
capturing the image before step (a) is performed.

10. An image processing method, comprising the steps of:
(a) dividing an image into a plurality of sub-images;
(b) generating a lightness difference of a target sub-image among the plurality of sub-images;
(c) judging whether the lightness difference is smaller than a first lightness threshold;
(d) judging whether an original average lightness of a target sub-image among the plurality of sub-images is higher than a second lightness threshold if the lightness difference is smaller than the first lightness threshold; and
(e) increasing the original average lightness of the target sub-image or adjusting the target sub-image into a white image if the original average lightness of the target sub-image is higher than the second lightness threshold.

11. The image processing method of claim 10, wherein the second lightness threshold of the image is generated according to a lightness histogram of the image.

* * * * *